United States Patent [19]

Lauzier

[11] 4,027,855
[45] June 7, 1977

[54] GUARD RAIL

[75] Inventor: René Lauzier, Ruy, France

[73] Assignee: CEGEBUR, Societe de Transformation de l' Aluminum Pechirey Paris, France

[22] Filed: Feb. 2, 1976

[21] Appl. No.: 654,077

[30] Foreign Application Priority Data

Mar. 21, 1975 France .............................. 75.09565

[52] U.S. Cl. ................................. 256/21; 256/65; 256/59; 403/252; 403/263
[51] Int. Cl.² ........................................ B21F 27/00
[58] Field of Search .................. 256/21, 22, 24, 59, 256/65, 67; 403/252, 263, 3, 4, 186

[56] References Cited
UNITED STATES PATENTS 3,067,985 12/1962 Cusack ........................... 256/67 X
3,202,401 8/1965 Bastia ............................... 256/24 X
3,313,527 4/1967 Eriksson ............................. 256/65

FOREIGN PATENTS OR APPLICATIONS 1,110,157 10/1955 France ............................. 256/22
2,174,309 8/1973 France Primary Examiner—Andrew V. Kundrat

[57] ABSTRACT

Guard rail having an inclined rail, for staircase or access stairway. The rails are essentially constituted by U-shaped profile sections. The vertical rails are fixed on the rails by elastic clipping action between the flanges of the profile sections.

The notches made in the vertical bars to provide this clipping action are incurvate, which makes it possible to adapt one and the same guard rail to variable angles of inclination of the handrail.

6 Claims, 4 Drawing Figures

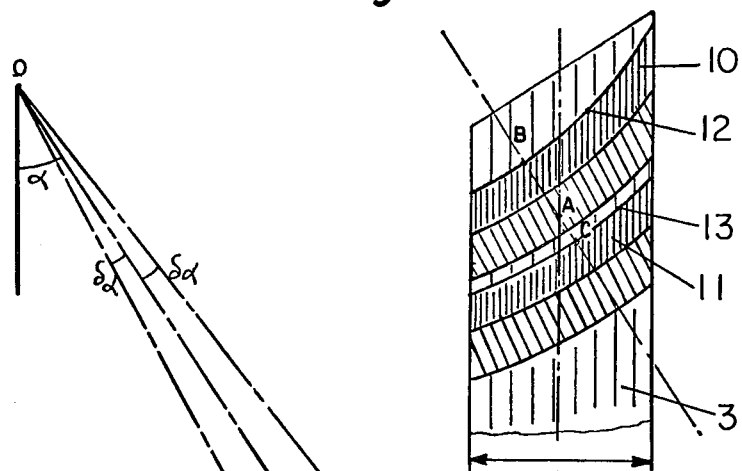
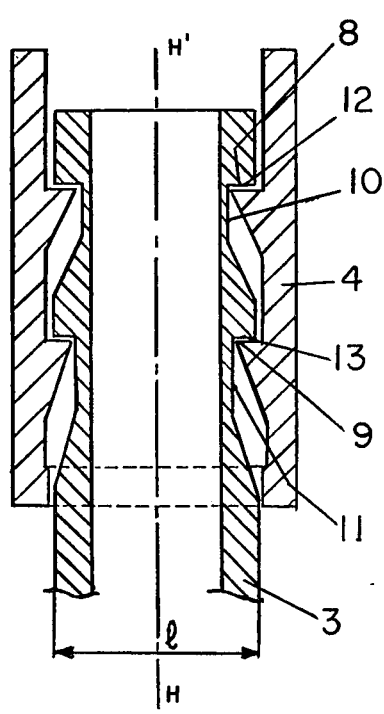
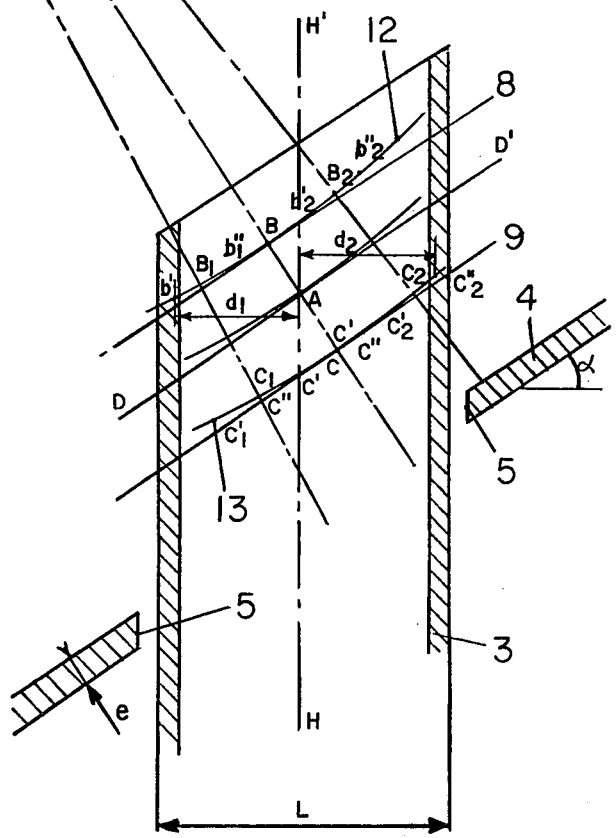

GUARD RAIL

The object of the present invention is an improvement to devices such as guard rails and balustrades of the type described in French Pat. No. 2,174,309. This improvement makes it possible to produce, with the same principle of assembly of the rails to the handrail, balustrades or guard rails having inclined handrails which can be used for ramps of variable inclines. The present improvement more particularly relates to the connection between an inclined handrail and vertical rails.

In the main patent, the handrails are constituted by profile sections of a substantially U-shape obtained most frequently by drawing. The two U's are turned back to back, that is to say that the webs of the profile sections are positioned face to face. The flanges of the upper profile section are turned upwardly while those of the lower profile section are turned downwardly. A series of perforations of dimensions corresponding to the cross-section of the rails are provided in the web of the U-shape profile. These perforations allow the ends of the rails to traverse the web of the two oppositely disposed profile sections and to become fixed by flexible engagement of "clipping" on projecting ribs provided for the purpose on the inside faces of the flanges of the U. These ends of the rails are themselves indented with rectilinear notches complementary to the ribs, on both faces of the rails corresponding to the two faces of the guard rail, in order to allow clipping onto the ribs.

The bearing surfaces of the ribs are orientated towards the open face of the profile section while the bearing surface of each notch which opposes detachment of the rails is normally an element of a plane surface at right-angles to the axis of the rails and directed towards the middle part of the rail. These bearing surfaces also face the web of the U-profile which constitutes the corresponding handrail.

It goes without saying that hereinafter the expression "profile of substantially U-shaped cross-section" must be understood in its widest sense, as indicated in U.S. Pat. No. 2,174,309. For aesthetic or other reasons, these U-shaped profiles constituting the handrail may be supplemented by filling or decorative elements.

The device for clipping the rails onto a handrail can obviously be used in the same way in guard rails which do not comprise two handrails but only a top handrail, whereas the rails are fixed directly into the ground at the bottom end.

It is possible likewise to use a similar clipping attachment device to produce inclined guard rails. It would be sufficient on the one hand to provide in the web of the U-shaped profile preparations allowing the passage of rails with the desired inclination and furthermore to provide the rails with inclined notches, the angle of the notches with the rails corresponding to that of the handrail with the rails, in the plane of the guard rail. Hereinafter, we will refer to the "plane of the guard rail" as the plane defined by the axes of the rails, a plane which is substantially the plane of symmetry of the guard rail.

However, the slope of steps may vary from one building to another, sometimes from one floor to another — the slope of the inclined planes or of roadways may even vary continuously. In this case, the handrail of guard rails must always follow the slope of the land or of the staircase or steps, while the rails must remain vertical.

It is, therefore, interesting to provide an inexpensive means of connection between handrail and rails requiring neither bolting nor the use of spacers and allowing a certain latitude of variation of the angle of the handrail with the rails, equal to the latitude of variation of inclination with respect to the horizontal envisaged for the handrail. It is known that in France and in the United States, the angles of inclination of staircases are usually comprised between 30° and 40°, whereas in other countries such as Germany and Holland, these angles of inclination are comprised between 35° and 45°. It will be readily appreciated that it would be economically very advantageous to produce standard banisters for staircases which could be used on almost all the staircases of one and the same country. For this it is sufficient to produce banisters manufactured at the factory for an average angle of inclination, for example 35° in France, but allowing a ±5° variation in the angle defined by the axis of the handrail with that of the vertical rails and about the mean angle.

Hereinafter, $\alpha$ will be the mean angle of inclination of the handrail with respect to the horizontal and $\delta\alpha$ will be the permissible variation on either side of this mean angle.

The object of the invention is a guard rail having an inclined handrail which meets this requirement. It is produced in the following way:

It is composed of vertical rails of width L in the plane of the guard rail and a handrail adapted to subtend with the horizontal an angle capable of varying between two limits $\alpha - \delta\alpha$ and $\alpha + \delta\alpha$, $\alpha$ being the mean angle of inclination. The handrail is itself essentially constituted by an open profile of generally U-shaped cross-section. The web of the profile, of thickness $e$ constituting the convex part of the U is turned towards the rails. It comprises perforations allowing the ends of the rails, themselves provided with at least one notch, to traverse the said webs and to become fixed by being clipped on projecting ribs provided for the purpose on the inside faces of the flanges of the handrail. As indicated in French Pat. No. 2,174,309, the perforations made in the web of the handrail are, at right-angles to the plane of the guard rail, of dimensions which will allow the passage of the vertical rails with the minimum transverse clearance as in the aforesaid patent. But the said perforations are, in the plane of the guard rail, of a horizontally measured width dimension ($L + e$ (tg $\delta\alpha$/cos $\alpha$)) allowing the passage of rails at an angle corresponding to the mean angle of inclination $\alpha$ of the banister, with, moreover, a clearance of ($e$ (tg $\delta\alpha$/cos $\alpha$)) allowing the ±$\delta\alpha$ variation of the angle on either side of the mean position.

The said perforations in the web of the handrail are preferably made in the plane of the guard rail obliquely with respect to the web of the guard rail. To ensure best possible guidance of the rails in the handrail, the axis of the perforations makes with the axis of the handrail the complementary angle of the angle $\alpha$, that is to say these axes are vertical when the handrail of the guard rail forms an angle $\alpha$ with the horizontal. The width of the perforations measured perpendicularly with respect to their axis and in the plane of the guard rail is again ($L + e$ (tg $\delta\alpha$/cos $\alpha$)).

Furthermore, the bearing surface of each notch on the corresponding rib of the handrail is incurvate, that is to say limited by surface of revolution tangent upon the bearing surface of the rib. The axis of this surface of revolution is perpendicular to the plane of the guard rail and traverses this plane beyond the handrail with respect to the portion of plane in which the rails are located, that is to say above the handrail for notches which are to engage in the upper handrail.

Indeed, the bearing surface of each notch on the complementary rib must ensure best possible contact with the rib while allowing the desired variation of angle about the mean angle defined. Since the ribs of the handrail are rectilinear, contact between a rib and a notch may be accepted over the entire bearing surface of the notch, as in French Pat. No. 2,174,309, which would eliminate any degree of liberty in the handrail/vertical rail connection and would determine a very precise angle. Theoretical contact can no longer occur except on a punctiform line and not on an area. However, in order to achieve best possible contact, the bearing surface of each notch must be a surface tangent to the homologous surface of the rib. The contact line will be a line of tangency of the two surfaces, this line of tangency being capable of variation, while the two surfaces themselves move, one with respect to the other, while remaining tangent. The particular feature of the guard rails produced according to the invention is that they comprise vertical rails assembled to the handrail by means of notches (generally produced by milling), of which the bearing surfaces supported on the corresponding surfaces of the ribs are incurvate. The bearing surfaces of the ribs of the handrails are generally flat in the form of strips at right-angles to the plane of the guard rail and orientated towards the open face of the profile section. The corresponding bearing surface of each notch is then an element of the cylinder of revolution tangent to the plane surface of the rib which, so to speak, allows the notch to roll on the rib as it would on a rail, or more exactly to slide on the rib, since each rail is compelled to traverse a corresponding perforation in the web of the handrail.

For rails which comprise only one notch per face, in a fashion similar to that envisaged for a straight guard rail, in U.S. Pat. No. 2,174,309, the bearing surface of each notch is defined in such a way as to ensure the best possible connection of the rails with the handrail; that is to say in the following manner:

The cylinder of revolution limiting the bearing surface of each notch is defined for the mean angle of slope of the handrail. Such a cylinder is easily determined by its intersection with the plane of the guard rail. This intersection is a circle tangent to the bearing surface of the rib corresponding to the notch. The center of the circle is one of the points on a line perpendicular to the plane of the supporting face passing through the intersection of this plane with the axis of the vertical rail. Thus, in the plane of the guard rail, it is possible to imagine the projection of the handrail and of the vertical rail in question, the axis of the vertical rail, the line of the supporting surface of the rib. A line is extended perpendicular to this line passing through the intersection of the axis of the vertical rail with the said line, this straight line is perpendicular to the supporting surface of the rib itself. It remains to choose of the circles tangent to the line of the bearing surface, a circle of which the center is on the said perpendicular.

Among all these circles, the circle of minimum radius is determined by the laws of the resistance of materials: each bar has to withstand a maximum transverse strain determined by the conditions of use. This transverse strain is transmitted to the handrail in the form of a shearing strain exerted by the notch on the rib. This strain produces a deformation of the notch and of the rib which convert the theoretical generatrix of contact into a surface of contact between notch and rib. This deformation must not exceed the elastic limit of the material, possibly reduced by a coefficient of safety. Thus, the minimum length of the radius of the cylinder is determined accurately by calculation as a function of the maximum strain allowed, the width of the bearing surface, the elastic limit of the material and the safety coefficient adopted. The cylindrical surface constituting the bearing surface of the notch will have a radius equal to or greater than the minimum radius calculated.

The width "L" of the vertical rail in the plane of the guard rail is likewise determined mathematically by the laws of the resistance of materials. In the plane of the guard rail, consider the figure which has made it possible to determine the cylinder bounding the bearing surface of the notch. A vertical rail is shown which, with the handrail, makes the two extreme angles permitted, in other words $\alpha - \delta\alpha$ and $\alpha + \delta\alpha$. Lines are drawn to represent the contact surfaces between notch and rib, when the vertical rail is subject to the maximum transverse strain and for the two extreme positions shown. The minimum width of the vertical rail in the plane of the guard rail is that inscribing all the points of contact corresponding to these two extreme cases.

In a preferred form of embodiment, the vertical rails comprise a plurality of successive incurvate notches corresponding to a plurality of parallel ribs, as shown in the drawings hereinafter. In order to determine the dimensions of these notches, the following procedure is adopted:

In the plane of the guard rail, the line of an imaginary rib is drawn to correspond with a midway position between the ribs effectively provided. As previously, a line is drawn perpendicular to the plane of the supporting surface of the imaginary rib extended to the point of intersection of the vertical rail axis with the said plane.

The various cylinders of revolution corresponding to the bearing surfaces of the various ribs must be coaxial in order to allow a satisfactory articulation of the vertical rail on the handrail. Consequently, the circles constituting the intersections of these cylinders with the plane of the guard rail are concentric circles tangent to the various ribs and their centers are intermingled at a point on the perpendicular defined hereinabove.

As in the case of the single rib, the position of the single axis of various cylinders is defined by the laws of resistance of the materials: a transverse frame exerted on a vertical rail is transmitted in the form of cutting stresses exerted by the notches on the ribs. The radii must be sufficiently great that the deformations of the notches and ribs do not exceed the admissible elastic limit.

The minimum width of the vertical rail in the plane of the guard rail is likewise determined mathematically as in the case of a single rib. The minimum width of the vertical rail is that in which the projection of all the contact surfaces between notches and ribs remain inscribed when the rail is subjected to the maximum transverse strain and when it makes with the handrail one or other of the two extreme angles allowed.

The invention will be better understood from the example described hereinafter:

FIG. 2 shows on a larger scale in the plane of the guard rail, the geometrical construction which makes it possible to determine the form and the dimensions of the notches and also the width of the vertical rail;

FIG. 3 shows on the same scale a cross-section of the handrail and the vertical rail through a vertical plane perpendicular to the plane of the guard rail; and FIG. 4 shows an elevational view of a vertical rail.

Figure 1:
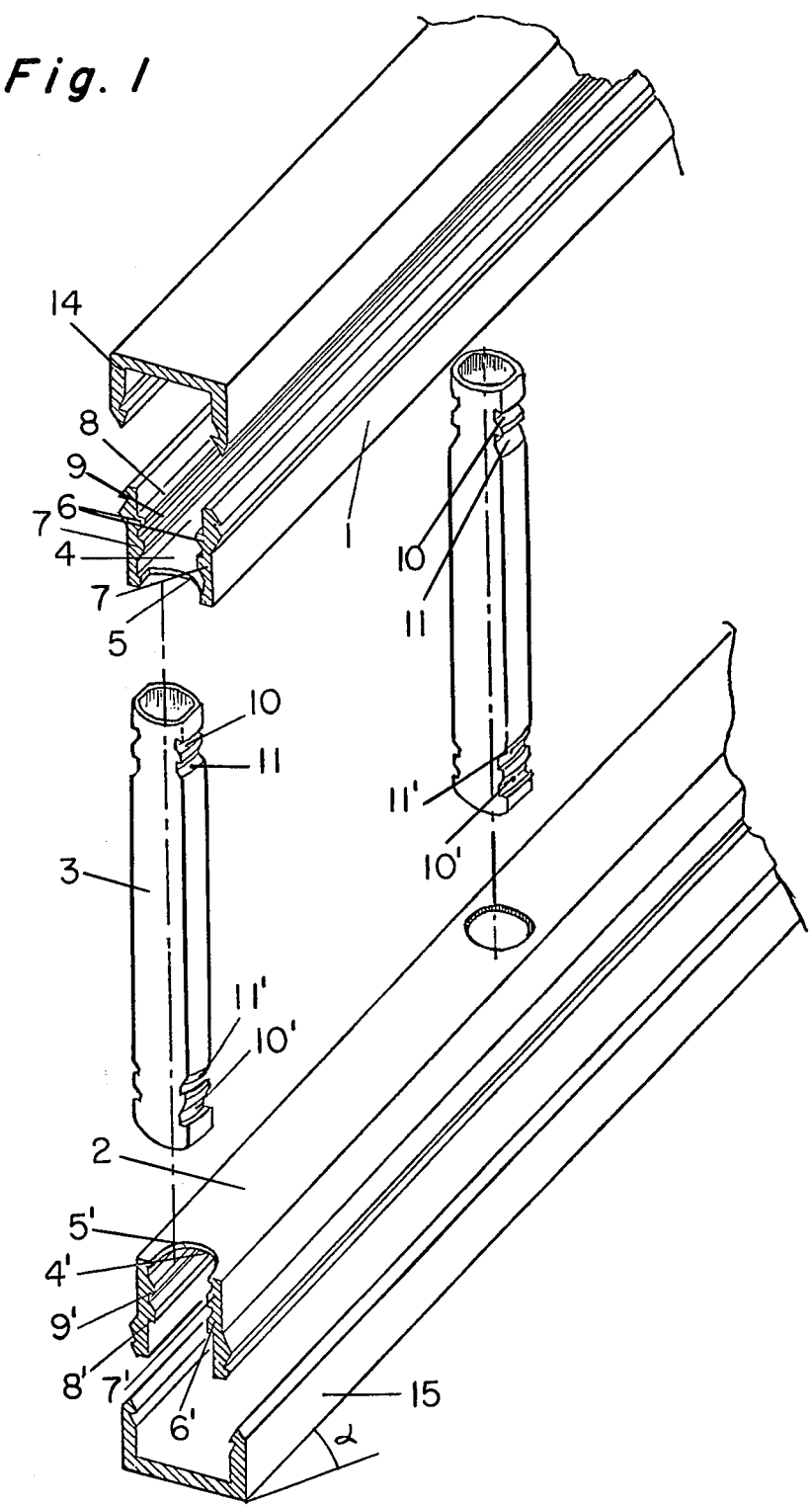
FIG. 1 is an exploded perspective view of an inclined guard rail according to the invention.

In FIG. 1 are shown the elements of the guard rail of which the handrail makes, with the horizontal, an angle $\alpha$ of 35° which may fluctuate between 30° and 40°. This guard rail is essentially composed of two rails constituted by profile sections 1 and 2 of substantially U-shape cross-section and a plurality of vertical tubular rails 3. The profiles 1 and 2 are produced by drawing, generally the most economical method of manufacture. The web 4 of each profile comprises a series of spaced perforations 5 dimensioned to allow the passage of the vertical rail 3. Subsequently, these rails make with the profile section a variable angle of between 60° and 50° complementary to the angle of inclination envisaged for the handrail. The contour of the perforations corresponds to that of the vertical rails with, in the plane of the guard rail, sufficient clearance corresponding to the 5° latitude of variation provided on either side of the mean angle subtended between the handrail and the vertical rails, in other words 55° in this particular case. The webs of the profile sections constituting the convex parts of the U of the rails are turned back to back, while the flanges are turned towards the exterior of the guard rail. The internal faces of these flanges are provided with rectilinear ribs 6–7 and 6'–7' of triangular cross-section. The plane surfaces 8–9 and 8'–9' are orientated towards the open faces of the profile section. The surfaces 8–9 and 8'–9' constitute the support faces of the device for clipping the vertical rails in position. The ends of the rails are provided with incurvate notches 10–11 and 10'–11' on the two faces corresponding to the two faces of the guard rail. The incurvate supporting surfaces of these notches are identified by references 12–13 and 12'–13'.

The bottom and top rails of this embodiment are completed by auxiliary profile sections 14–15 the roll of which is above all aesthetic and they do not form part of the object of the invention. These auxiliary profile sections may, however, help to reinforce the rails 1 and 2.

FIG. 2 will make it possible easily to understand the manner of defining notches made in the vertical rails in the plane of the guard rail.

The web 4 of the upper profile section is represented with the mean inclination with respect to the horizontal, in other words, $\alpha=35°$. The vertical rail 3 with its axis HH' is shown in the vertical position. The web of thickness $e$ of the profile 4 comprises an oblique perforation 5 which in the plane of the guard rail allows the vertical rail 3 a clearance $e$ (tg $\delta\alpha$/cos) sufficient to allow it a variation of angle $\delta\alpha$ of 5° on either side of the vertical. The drawing shows the lines of the bearing surfaces 8–9 of the ribs 6–7. A straight line DD' is drawn in the middle of the lines 8–9. DD' represents the line of the intersection with the plane of the guard rail of the bearing surface of an imaginary rib set midway between 6 and 7. HH' and DD' define a point of intersection A. At A is raised a line perpendicular to DD'. The concentric circles which are in the plane of the guard rail the lines of the cylinders defining the supporting surfaces of the notches 10–11 have for their center a point 0 situated on the upper part of the perpendicular. The notches 10–11 are theoretically tangent to the support faces 8–9 of the ribs at the points B and C. It remains to define a point 0 on this half-line. This point is defined by a calculation of resistance of materials.

A transverse strain exerted on this vertical rail and determined by the conditions of use envisaged is transmitted in the form of a shearing stress on the two notches. As a primary approximation, it may be accepted that this strain is distributed equally between the two notches and results in a deformation of the material which is translated by a flattening of the cylindrical surface of each notch. The calculation is made for the lower notch 11, the depth of which is normally the smallest. The calculation makes it possible to define as a function of its radius OC the deformation of a cylinder of given thickness subject to a given frame. The arc ($c'Cc'''$) is transformed into a chord ($c'Cc''$) corresponding to the line of the bearing surface in the plane of the guard rail. The deformation CC' must not exceed the elastic limit of the material, which defines a point 0, a center of the circle of minimum radius giving an admissible deformation CC' and a bearing width $c'c''$ in the plane of the guard rail.

It remains to determine the minimum width L of the vertical rail. For this, it is necessary to trace the points C1 and C2 corresponding to the points of contact of the notch and the rib when the vertical rail is not subject to any stress and when the said rail makes with the handrail one or other of the two extreme angles allowed, $\alpha-\delta$ and $\alpha + \delta\alpha$. The next stage to plot the arc ($c'1$ C1 $c''1$) and ($c'2$ C2 $c''2$) corresponding to the bearing surfaces when the vertical rail makes with the handrail the two extreme angles about the mean angle. ($c'1$) and ($c''2$) must be located within the limits of the vertical rail. The same calculation is made again and the same drawing prepared for the upper notch 10; thus are determined new limit points ($b'1$) and ($b''2$). The minimum width of the vertical rail in the plane of the guard rail is that which embraces the points ($b'1$) and ($c''2$), while (HH') remains the axis of symmetry.

The distances ($d1$) and ($d2$) of ($b'1$) and ($c''2$) to (HH') are measured. In the plane of the guard rail, the minimum width of the rail of axis (HH') is twice the greater of the value ($d1$) or ($d2$).

The drawing shows that if 0 moves away while the angle remains constant, the distances (BB1), (BB2) and (CC1), (CC2) increase.

In order to have rails of reasonable width, it is worthwhile having 0 as close as possible to A, in other words the point 0 corresponding to the minimum radius given by calculation of the resistance of materials.

Vertical rails of width $L=15$ mm and a thickness $1=22.5$mm and made from aluminum allow a minimum deformation ($BB'$) = ($CC'$) = 0.2mm have been produced with notches of which the radii of curvature are ($OB$) = 34.5mm and ($OC$) = 41.4mm.

It is quite evident that this radius can be calculated by more elaborate methods than that indicated here, in particular by using more accurate calculations employing a computer.

Determinations by calculation and drawing may be evidently supplemented by practical tests to verify that in no case is the elastic limit exceeded. It is possible likewise to verify that there is an adequate coefficient of safety with respect to impact which would result in the notches being destroyed by shearing.

I claim:

1. Guard rail comprising an inclined handrail and vertical bars of a width L in the plane of the guard rail and which forms with the horizontal an angle capable of varying between two limits $\alpha-\delta\alpha$ and $\alpha+\delta\alpha$, the said handrail being itself essentially constituted by an open profile section of generally U-shaped cross-section in which the side walls of the profile extend in the direction away from the handrail and with the web of the profile being of a thickness $l$, ribs extending inwardly from said side walls, perforations in the web of the hand rail dimensioned to allow the ends of the vertical bars to traverse the said web, at least one notch in the end portion of said vertical bar to be secured by clipping on ribs extending inwardly from the side walls of the handrail, said guard rail being characterized in that on the one hand the perforations in the web of the hand rail have in the plane of the guard rail a horizontally measured width $L + e\ (tg\delta\alpha/\cos\alpha)$ and in that, on the other, the bearing surface of each notch on the corresponding rib of the rail is defined by a surface of revolution tangent to the bearing surface of the rib, the axis of this surface of revolution being at right-angles to the plane of the guard rail and traversing this plane beyond the rail with respect to the portion of the plane in which the vertical bars are located.

2. Guard rail according to claim 1, characterized in that the perforations in the web of the hand rail are preferably made in the plane of the guard rail obliquely with respect to the web of the hand rail, the axis of the perforations making with the axis of the rail the complementary angle to the angle $\alpha$, the width of these perforations measured perpendicularly to their axis and in the plane of the guard rail being $L + e\ (tg\delta\alpha/\cos\alpha)$.

3. Guard rail according to claim 1, of which each vertical bar comprises on the side facing the side wall of the hand rail only a single incurvate notch, characterized in that the surface of revolution defining the supporting surface of the notch is a cylinder of revolution tangent to the bearing surface of the corresponding limit according to a generatrix which cuts the axis of the vertical bar, when this latter is in the position corresponding to the mean angle of inclination of the handrail.

4. Guard rail according to claim 3, characterized in that the cylinder of revolution limiting the supporting surface of the incurvate notch is of a radius equal to or greater than that determined by the laws of resistance of the materials, the deformation of the materials constituting the notch and the corresponding rib being required not to exceed the admissible elastic limit.

5. Guard rail according to claim 1, characterized in that in the plane of the guard bar each vertical rail has a width equal to or greater than that in which the projections of all the points of contact between notch and rib are inscribed when the vertical bar is positioned according to one or other of the extreme angles about the mean angle and when the said vertical rail is subject to the maximum transverse strain.

6. Guard rail according to claim 1 of which each vertical bar comprises at least on a face facing each side wall of the hand rail a plurality of successive incurvate notches, characterized in that these notches have their bearing surfaces defined by coaxial cylinders perpendicular to the plane of the guard rail and of which the common axis cuts the said plane at a point on the perpendicular raised in the plane of the guard rail to the supporting surface of an imaginary rib disposed between the existing ribs, the said perpendicular passing through the intersection of the plane of the imaginary rib and the axis of the vertical bar, the minimum radius of the coaxial cylinders and the width of the vertical bar in the plane of the guard rail being defined by the laws of resistance of the materials as a function of the elastic limit of the materials.

* * * * *

UNITED STATES PATENT OFFICE
CERTIFICATE OF CORRECTION

Patent No. 4,027,855          Dated June 7, 1977

Inventor(s)     René Lauzier

It is certified that error appears in the above-identified patent and that said Letters Patent are hereby corrected as shown below:

On the Title Page Assignee should read -- CEGEDUR, Societe de Transformation de l' Aluminum Pechiney --.

Signed and Sealed this

*Thirteenth* Day of *June 1978*

[SEAL]

*Attest:*

RUTH C. MASON
*Attesting Officer*

DONALD W. BANNER
*Commissioner of Patents and Trademarks*